United States Patent [19]

Matsumura et al.

[11] Patent Number: 4,760,124
[45] Date of Patent: Jul. 26, 1988

[54] CRYSTALLINE POLYESTER-IMIDE, PROCESS FOR PRODUCTION THEREOF, AND USE THEREOF

[75] Inventors: Shunichi Matsumura; Hiroo Inata; Shigeyoshi Hara, all of Iwakuni, Japan

[73] Assignee: Teijin Limited, Osaka, Japan

[21] Appl. No.: 887,944

[22] Filed: Jul. 22, 1986

[30] Foreign Application Priority Data

Jul. 25, 1985 [JP] Japan .................. 60-162892
Nov. 25, 1985 [JP] Japan .................. 60-262496

[51] Int. Cl.⁴ ............................................. C08G 73/16
[52] U.S. Cl. ..................... 528/170; 528/183; 528/184; 528/188
[58] Field of Search ............... 528/170, 183, 184, 188

[56] References Cited

U.S. PATENT DOCUMENTS 3,567,685 3/1971 Bialous et al. .................. 528/170
4,206,261 6/1980 Laganis et al. ................. 528/170

FOREIGN PATENT DOCUMENTS 133024 7/1985 Japan .
190423 9/1985 Japan .

Primary Examiner—Harold D. Anderson
Attorney, Agent, or Firm—Sherman and Shalloway

[57] ABSTRACT

Melt-moldable crystalline polyester-imides comprising units of the following formula (IA)

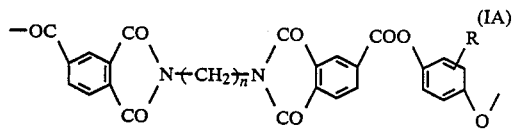

wherein R represents a hydrogen atom, an alkyl group having 1 to 10 carbon atoms, a cycloalkyl group having 5 to 10 carbon atoms, an aryl group having 6 to 10 carbon atoms, an aralkyl group having 7 to 12 carbon atoms, an alkoxy group having 1 to 10 carbon atoms, or a halogen atom, and n is an integer of 2 to 12, as main recurring units. The polyester-imides are prepared by (1) condensing a starting mixture containing 1 mole of an imidodicarboxylic acid and 2 to 20 moles of an aromatic monohydroxy compound under heat while distilling water out of the reaction system or (1)' condensing a starting mixture comprising 1 mole of trimellitic anhydride, 0.5 to 0.8 mole of an aliphatic diamine and 2 to 20 moles of an aromatic monohydroxy compound under heat, and thereafter (2) polycondensing the resulting reaction mixture under heat with an amount, sufficient to distill substantially all of the aromatic monohydroxy compound from the reaction system, of a diol compound or a mixture of the diol compound and an aliphatic diamine until substantially all of the aromatic monohydroxy compound is distilled out of the reaction system.

18 Claims, No Drawings

CRYSTALLINE POLYESTER-IMIDE, PROCESS FOR PRODUCTION THEREOF, AND USE THEREOF

This invention relates to novel polyester imides, and more specifically, to novel crystalline polyester imides which can be melt-molded to give molded articles, such as films and fibers, having excellent mechanical properties, particularly high toughness, and excellent chemical properties.

Polyethylene terephthalate has excellent mechanical and chemical properties and is extensively used as fibers, films and plastics. With a striking advance in technology in recent years, materials having higher mechanical properties or higher heat resistance have been desired.

Polymers showing optical anisotropy in the molten state, which are so-called liquid crystalline polymers, have been suggested as such materials. They include, for example, self-condensation polymers of p-hydroxybenzoic acid, 2-hydroxy-6-napthoic acid, etc., and polymers comprising an ester of a terephthalic acid component and a hydroquinone component as structural units. These liquid crystalline polymers have a high melting point and a high Young's modulus and can be said to be superior molding materials. However, because of their high intramolecular force, they are liable to be oriented monoaxially when melt-molded, and for example, a biaxially oriented film as can be obtained from polyethylene terephthalate is extremely difficult to produce from the liquid crystalline polymers by an ordinary melt-molding method.

On the other hand, polyethylene 2,6-naphthalate and a polyester obtained by condensing a 4,4'-(ethylenedioxy)dibenzoic acid component and an ethylene glycol component is known as a polymer which are optically isotropic in the molten state and has higher aromaticity and molecular rigidity than polyethylene terephthalate. The melting point and Young's modulus of these polyesters, however, are not so high as those of the liquid crystalline polymers.

U.S. Pat. No. 4,176,223 discloses fiberforming polyimide-esters consisting essentially of units having the structural formulas:

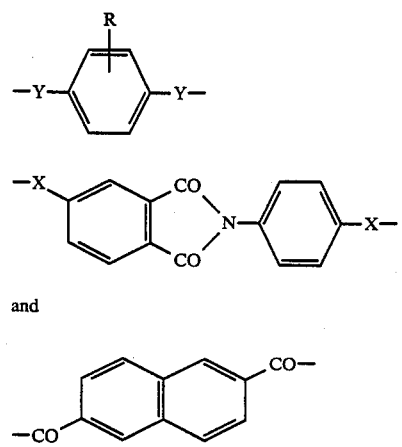

such that when X is —CO—, Y is —O—, R is Cl or a $C_{1-2}$ alkyl, unit III is present in an amount of from 5 to 20 mole percent based on the total number of moles of units; and the sum of moles of units II and III is substantially equal to the number of moles of unit I; and when X is —O—, Y is —CO—, R is H, unit III is present in an amount of from 5 to 20 mole percent based on the total number of moles of units, and the sum of moles of units I and III is substantially equal to the number of moles of unit II.

Japanese Laid-Open Patent Publication No. 113222/1983 discloses a filament-forming polyester-imide selected from combinations I, II and III

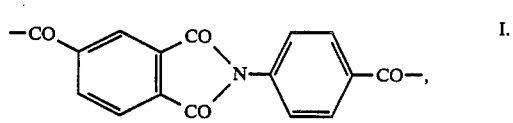

—O—Ar—O— and

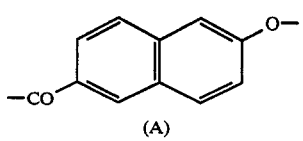

(A)

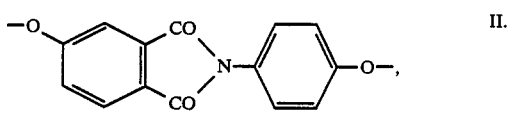

—CO—Ar—CO—
and unit (A)

or

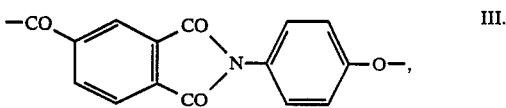

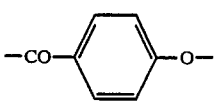

and unit (A)

such that in the combinations I and II, unit (A) is present in an amount of 10 to 30 mole %, the dioxy units and the dicarbonyl units are present in substantially equimolar proportions, and Ar represents m- or p-phenylene which may be substituted; and in the combination III, the unit (A) is present in an amount of 40 to 60 mole %, and the other units are present in an amount of 20 to 30 mole %.

Japanese Laid-Open Patent Publication No. 105596/1978 discloses a polyester-imide represented by the following formula

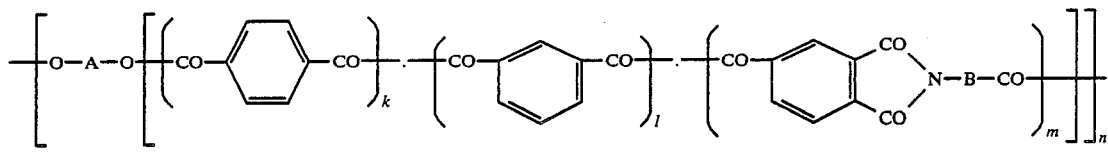

wherein $k+l+m=1$, $k:l=10:0$ to $0:10$, $(k+l):m=1:9$ to $9:1$, n is an integer of at least 8, and A and B, independently from each other, represent a divalent aromatic hydrocarbon group. Examples in this patent document describe that a film was obtained from the above polymer by press-forming.

U.S. Pat. No. 3,880,812 discloses poly(alkylenetrimellitate imides) having an inherent viscosity of at least 0.3 dl/g suitable for forming films, coatings and molded objects. U.S. Pat. No. 4,012,556 discloses a magnet wire bearing a continuous self-bonding varnish top coat composed of the aforesaid poly(alkylenetrimellitate imide).

As stated above, the known polyester-imides can be roughly classified into (1) polyester-imides composed of esters formed between an aliphatic glycol component and an imidodicarboxylic acid component derived from an aliphatic diamine and trimellitic acid, (2) polyester-imides comprising an imidodicarboxylic acid derived from trimelliic acid and an an aromatic diamine as a main acid component, (3) polyester-imides comprising N-p-carboxyphenyltrimellitimide as a main acid component, and (4) polyester-imides containing an imidohydroxycarboxylic acid derived from an amino alcohol and trimellitic acid.

The polyester-imides (1), however, have a low melting point or low crystallinity. The polyester-imides (2) have a high melt viscosity and are difficult to mold by an ordinary melt-molding technique. The polyester-imides (3) are difficult to fabricate because of their high melting point and viscosity. Of the polyester-imides (4), those composed of esters between N-p-carboxyphenyltrimellitimide and aromatic diols are difficult to mold because of their high melting point and viscosity. Those composed of esters between N-p-carboxyphenyltrimellitimide and aliphatic diols have the disadvantage that during melt-polymerization or melt-molding, the imide group is susceptible to decomposition. Another problem with the polyester-imides (4) is that since they are amorphous or have low crystallinity, they have inferior heat resistance. These conventional polyester-imides are used as varnishes, enamels and the like, and are generally difficult to fabricate by melt-molding.

Japanese Laid-Open Patent Publication No. 91818/1983 discloses fibers or films of a polyester composed of the following units (I) to (IV)

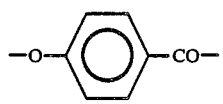 (I)

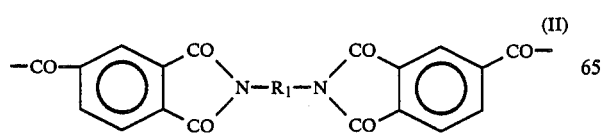 (II)

-continued

 (III)

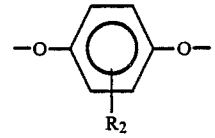 (IV)

wherein $R_1$ is a divalent aliphatic group having 4 to 8 carbon atoms, and $R_2$ is selected from H, $CH_3$, Cl, Br and combinations of these, wherein the proportion of unit (I) is 20 to 60 mole %, the proportion of unit (II) is 5 to 20 mole %, the proportion of unit (III) is 5 to 35 mole %, and the proportion of unit (IV) is 20 to 40 mole %. This patent document states that if the proportion of unit (II) exceeds 20 mole %, the resulting fibers or films have a lowered Young's modulus, and that the polyester forms molten liquid crystals.

It is an object of this invention to provide novel crystalline polyester-imides.

Another object of this invention is to provide crystalline polyester-imides which are optically anisotropic in the molten state at relatively low temperatures and optically isotropic in the molten state at high temperatures.

Still another object of this invention is to provide crystalline polyester-imides which can be melt-molded at temperatures at which they are optically isotropic.

Yet another object of this invention is to provide novel polyester-imides having excellent mechanical properties, particularly high toughness, and excellent thermal and chemical properties.

A further object of this invention is to provide processes for producing the novel crystalline polyester-imides of the invention with industrial advantage.

A still further object of this invention is to provide melt-molded articles such as fibers or films of the polyester-imides of the invention.

Additional objects of this invention along with its advantages will become apparent from the following description.

According to this invention, the above objects and advantages of this invention are achieved by melt-moldable crystalline polyester-imides comprising units of the following formula (IA)

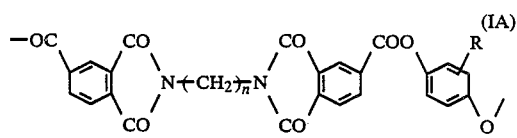 (IA)

wherein R represents a hydrogen atom, an alkyl group having 1 to 10 carbon atoms, a cycloalkyl group having 5 to 10 carbon atoms, an aryl group having 6 to 10 carbon atoms, an aralkyl group having 7 to 12 carbon atoms, an alkoxy group having 1 to 10 carbon atoms, or a halogen atom, and n is an integer of 2 to 12, as main recurring units.

The crystalline polyester-imides of this invention preferably contain at least 50 mole %, especially at least 60 mole %, based on the entire recurring units, of the units of formula (IA).

The crystalline polyester-imides of this invention contain ester linkages and imide linkages as main linkages, and in addition, may contain amide linkages.

The crystalline polyester-imides of the invention may contain units of the following formula (IIA)

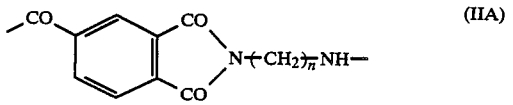
(IIA)

wherein n is an integer of 2 to 12, and the —NH— group forms an amide linkage. The group —NH— in the above formula (IIA) forms an amide linkage in the polymer chain.

According to this invention, the above polyester-imides of the invention can be produced by a process which comprises (1) condensing a starting mixture containing 1 mole of an imidodicarboxylic acid represented by the following formula (IB)

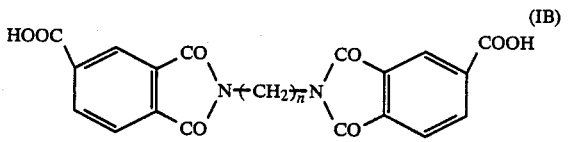
(IB)

wherein n is an integer of 2 to 12, and 2 to 20 moles of an aromatic monohydroxy compound represented by the following formula (IIB)

Ar—OH (IIB)

wherein Ar represents a benzene or naphthalene ring which may be substituted by a halogen atom or an alkyl group having 1 to 10 carbon atoms, under heat while distilling water out of the reaction system, and (2) thereafter polycondensing the resulting reaction mixture with an amount, sufficient to distill substantially all of the aromatic monohydroxy compound, of a diol compound comprising a major proportion of a hydroquinone represented by the following formula (IIIB)

(IIIB)

wherein R represents a hydrogen group having 1 to 10 carbon atoms, a cycloalkyl group having 5 to 10 carbon atoms, an aryl group having 6 to 10 carbon atoms, an aralkyl group having 7 to 12 carbon atoms, an alkoxy group having 1 to 10 carbon atoms, or a halogen atom, or a mixture of the diol compound and an aliphatic diamine under heat until substantially all the aromatic monohydroxy compound is distilled out of the reaction system.

The imidodicarboxylic acid used in step (1) is represented by formula (IB) wherein n is an integer of 2 to 12, preferably an even number, especially preferably 6 or 12. Examples of the imidodicarboxylic acid are N,N'-ethylenebistrimellitimide, N,N'-triethylenebistrimellitimide, N,N'-tetramethylenebistrimellitimide, N,N'-pentamethylenebistrimellitimide, N,N'-hexamethylenebistrimellitimide, N,N'-octamethylenebistrimellitimide, N,N'-decamethylenebistrimellitimide, and N,N'-dodecamethylenebistrimellitimide.

The imidodicarboxylic acid can be very easily synthesized by, for example, subjecting trimellitic anhydride and the corresponding aliphatic diamine [$H_2N$-$(CH_2)_n$-$NH_2$] to a known imidization reaction. Examples of the aliphatic diamine are ethylenediamine, triethylenediamine, tetramethylenediamine, pentamethylenediamine, hexamethylenediamine, octamethylenediamine, decamethylenediamine, and dodecamethylenediamine.

The aromatic monohydroxy compound used in step (1) is represented by formula (IIB) and is a phenol or naphthol which may be substituted by a halogen atom or an alkyl group having 1 to 10 carbon atoms. Examples of the aromatic monohydroxy compound are phenol, m-cresol, p-cresol, m-chlorophenol, p-octylphenol, p-nonylphenol, p-chlorophenol, alpha-naphthol and beta-naphthol. Of these, phenol and cresol are preferred, and phenol is especially preferred.

The aromatic monohydroxy compound is used in an amount of 2 to 20 moles, preferably 3 to 10 moles, per mole of the imidodicarboxylic acid.

The reaction (esterification) temperature of step (1) is preferably 210° to 310° C., especially preferably 220° to 300° C. If the reaction temperature is below 200° C., the rate of the reaction is slow, and if it is higher than 320 ° C., coloration of the reaction product increases undesirably.

As the reaction proceeds, water is formed as a by-product in the reaction system and an aryl imidodicarboxylate as an ester between the imidodicarboxylic acid and the aromatic monohydroxy compound, is formed.

The reaction can be carried out under normal atmospheric pressure or an elevated pressure. When the boiling point of the aromatic monohydroxy compound under atmospheric pressure is below the reaction temperature, the reaction is preferably carried out under elevated pressures. Preferably, the reaction system is kept in an atmosphere of an inert gas such as nitrogen or argon.

The reaction time is one sufficient for the esterification reaction to proceed fully. It is, for example, 30 minutes to 20 hours, preferably about 1 to 10 hours, although varying depending upon the reaction temperature, the scale of the reaction, etc.

The above reaction is carried out while water generated by esterification is removed out of the reaction system. The esterification reaction is an equilibrium reaction, and as the generated water is removed out of the reaction system, the reaction proceeds, and the yield and purity of the product increase. The generated water can be removed out of the reaction system by utilizing a difference in boiling point between the water and the aromatic monohydroxy compound. It can also be removed out of the reaction system by azeotropic distillation using an organic solvent that forms an azeotropic mixture with water. The organic solvent should be one which does not undergo decomposition under the reaction conditions nor react with the imidodicarboxylic acid and the aromatic monohydroxy compound, but forms an azeotrope with water. Specific examples include aromatic hydrocarbons such as toluene, xylene and ethylbenzene. Preferably, the conversion of the esterification reaction is adjusted to at least 80%. The conversion can be known from the amount of water formed by the reaction. To determine it accurately, a part of the reaction product is sampled, and its unreacted —COOH content is measured. Let the —COOH content of the reaction product be C (equivalents/$10^6$ g), the reaction conversion can be calculated in accordance with following equation.

$$\text{Conversion} = \frac{2 \times 10^6 - M \times C}{2 \times 10^6 + (2m - 36) \times C} \times 100 \, (\%)$$

wherein M is the molecular weight of the imidodicarboxylic acid (for example M=464 in the case of N,N'-hexamethylenebistrimellitimide), m is the molecular weight of the aromatic monohydroxy compound, and C is the unreacted carboxy equivalent measured of the reaction product which was obtained by washing it well with water and removing the excess of the aromatic monohydroxy compound.

The carboxyl group is measured in accordance with the method of A. Conix Macromol. Chem., 26, 226 (1958)].

In order to increase the rate of the reaction, the reaction in step (1) is preferably carried out in the presence of a small amount of a catalyst added. The catalyst, may be a known esterification catalyst such as tin (Sn), titanium (Ti), antimony (Sb), manganese (Mn), zinc (Zn), sodium (Na) and potassium (K) and compounds thereof. These catalytic materials may be used singly or in combination. The amount of the catalyst used is about 0.005 to 5 mole %, preferably about 0.01 to 3 moles, based on the imidodicarboxylic acid used.

The excess aromatic monohydroxy compound in the reaction mixture of the imidodicarboxylic acid and the aromatic monohydroxy compound may be distilled during polycondensation in the next step (2). Alternatively, it may be distilled in the next step (2) prior to the addition of the diol compound with or without the aliphatic diamine.

Thereafter, in step (2), the resulting reaction mixture containing the diaryl imidodicarboxylate obtained in step (1) is polycondensed with the diol compound containing a major proportion of a hydroquinone represented by the following formula (IIIB)

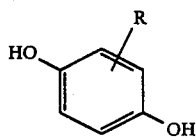

(IIIB)

wherein R is as defined above, or the diol compound and an aliphatic diamine under heat.

Examples of the substituent R in formula (IIIB) include alkyl groups having 1 to 10 carbon atoms such as methyl, ethyl, propyl, isopropyl, butyl, isobutyl, t-butyl, pentyl, t-amyl and hexyl; alkoxy groups having 1 to 10 carbon atoms such as methoxy, ethoxy, propoxy, isopropoxy, butoxy, isobutoxy, t-butoxy, pentoxy, t-amyloxy and hexoxy; halogen atoms such as chlorine and bromine; cycloalkyl groups having 5 to 10 carbon atoms such as cyclopentyl and cyclohexyl; aryl groups having 6 to 10 carbon atoms such as phenyl and tolyl, and aralkyl groups having 7 to 12 carbon atoms such as benzyl, methylbenzyl and dimethylbenzyl.

Examples of preferred compounds of formula (IIIB) are hydroquinone, methylhydroquinone, t-butylhydroquinone, t-amylhydroquinone and chlorohydroquinone.

Examples of another diol compound that can be preferably used together with the hydroquinone of formula (IIIB) are compounds represented by the following formula (IVB)

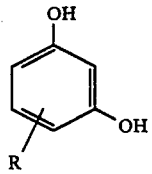

(IVB)

wherein R is as defined above, compounds represented by the following formula (VB)

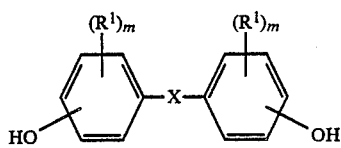

(VB)

wherein X is —CH$_2$—, —C(CH$_3$)$_2$—, —O—, —S—, —SO$_2$—, —CO—,

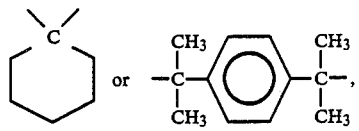

R$_1$ represents an alkyl group having 1 to 10 carbon atoms, an aryl group having 6 to 10 carbon atoms, or a halogen atom, and m is 0, 1 or 2, and linear or branched aliphatic diols having 2 to 6 carbon atoms.

Examples of the substituent R in formula (IVB) may be the same as those given hereinabove with respect to formula (IIIB).

Examples of the compounds of formula (IVB) are resorcinol, methylresorcinol, t-butylresorcinol, t-amylresorcinol and chlororesorcinol.

Examples of the alkyl groups having 1 to 10 carbon atoms, the aryl group having 6 to 10 carbon atoms and the halogen for the substituent R$^1$ in formula (VB) may be the same as those given above with regard to formula (IIIB).

Examples of preferred compounds of formula (VB) are 2,2-bis(4-hydroxyphenyl)propane (bisphenol A), 1,1-bis(4-hydroxyphenyl)cyclohexane, 4,4'-dihydroxyphenylsulfone, 4,4'-dihydroxydiphenylether, 3,4'-dihydroxydiphenylether, 4,4'-dihydroxybenzophenone, 4,4'-dihydroxydiphenylmethane, 3,4'-dihydroxydiphenylmethane, 3,4'-dihydroxybenzophenone, 2,2'-dimethylbisphenol A, 2,2'-dichlorobisphenol A, 2,2'-dibromobisphenol A, 2,2',6,6'-tetramethylbisphenol A, 2,2',6,6'-tetrachlorobisphenol A, 2,2',6,6'-tetrabromobisphenol A, 1,4-bis2-(p-hydroxyphenyl)propyl]benzene and 1,3-bis2-(p-hydroxyph benzene.

Examples of the linear or branched aliphatic diol having 2 to 6 carbon atoms are ethylene glycol, tetramethylene glycol, neopentyl glycol and hexamethylene glycol.

2,6-Dihydroxynaphthalene, 4,4'-dihydroxydiphenyl and phenolphthalein are diols which can equally be used as the above compounds of formulae (IVB) and (VB) and the aliphatic diols.

The diol used in step (2) is preferably hydroquinone, methylhydroquinone or t-butyl hydroquinone alone or a combination of these hyroquinones with each other or with bisphenol A, 4,4'-dihydroxydiphenylsulfone, neopentyl glycol or resorcinol.

Preferably, the aliphatic diamine is, for example, a compound represented by the following formula (VIB)

$$H_2N+CH_2)_nNH_2 \quad (VIB)$$

wherein n is an integer of 2 to 12.

The diol compound or a mixture of the diol compound and the aliphatic diamine is added to the reaction mixture obtained in step (1) in an amount sufficient to distill substantially all the aromatic monohydroxy compound forming the aryl ester in the reaction mixture. Advantageously, the diol or the mixture of it with the aliphatic diamine is used in an amount of 1.0 to 1.2 moles, preferably 1.0 to 1.1 moles, per mole of the imidodicarboxylic acid used in step (1).

The polycondensation step in step (2) may be carried out by methods known in the art. Specifically, the initial temperature of polycondensation, for example, is preferably 180° to 280° C., and more preferably 200° to 260° C., and the final temperature of the polycondensation is preferably from the melting point of the resulting polymer to 360° C., more preferably from a temperature at least 10° C. higher than the melting point of the resulting polymer to 350° C. At this time, the temperature may be elevated continuously or stepwise. Generally, the atmosphere in which the reaction is carried out is maintained under atmospheric to elevated pressures in the early stage, and as the polycondensation proceeds, the pressure of the atmosphere is gradually reduced. In the final stage of the polycondensation, the pressure of the atmosphere is kept under a high vacuum of 1 mmHg or below. Preferably, the pressure reduction is effected after the final temperature of the polycondensation has been reached. Preferably, the reaction is carried out in an atmosphere of an inert gas such as nitrogen or argon.

The polycondensation reaction time may be one sufficient to distill off the aromatic monohydroxy compound and optionally the excess of the diol and/or the aliphatic diamine. The total time required for the polycondensation is preferably about 10 hours at the longest, more preferably not more than about 8 hours.

The polycondensation is preferably carried out in the presence of a small amount of a catalyst. The catalyst may, for example, be any of the compounds exemplified above with respect to step (1). When a catalyst is used in step (1), it may be directly used as a polycondensation catalyst in step (2). Alternatively, the same or other kind of catalyst may be added at the time of starting the polycondensation reaction.

When the aliphatic diamine is used, it is desirably the same as the aliphatic diamine constituting the imidodicarboxylic acid used in step (1). The amount of the aliphatic diamine is preferably not more than 30 mole %, more preferably not more than 20 mole %, especially preferably not more than 10 mole %, based on the imidodicarboxylic acid used in step (1).

As required, in step (2), a small amount of another dicarboxylic acid and/or a hydroxycarboxylic acid may be added together with the diol. Examples of the other carboxylic acid and the hydroxycarboxylic acid include terephthalic acid, isophthalic acid, diphenyldicarboxylic acid, 4,4'-diphenyletherdicarboxylic acid, 3,4'-diphenyletherdicarboxylic acid, 2,6-naphthalenedicarboxylic acid, 1,5-naphthalenedicarboxylic acid, 2,7-naphthalenedicarboxylic acid, 4,4'-phenoxyethanedicarboxylic acid, succinic acid, adipic adid, sebacic acid, dodecanoic acid, 1,4-cyclohexanedicarboxylic acid, m-hydroxybenzoic acid, 6-hydroxy-2-naphthoic acid and hydroxycaproic acid. The amount of the dicarboxylic acid and/or hydroxycarboxylic acid used is preferably not more than 30 mole %, more preferably not more than 20 mole %, especially preferably not more than 10 mole %, based on the imidodicarboxylic acid used in step (1).

A polyfunctional compound and/or a monofunctional compound may be added so long as the resulting polymer is maintained substantially linear. Examples of the polyfunctional compound are trimesic acid, trimellitic acid, benzophenonetetracarboxylic acid, pyromellitic acid, glycerol, trimethylolpropane, and pentaerythritol. Benzoic acid, benzoylbenzoic acid and naphthoic acid may be cited as examples of the monofunctional compound. The amount of the polyfunctional compound and/or the monofunctional compound is preferably not more than 5 mole %, more preferably not more than 3 mole %, especially preferably not more than 1 mole %, based on the dicarboxylic acid component.

It is also preferable to add a diaryl carbonate at the time of adding the diol. Since this results in the formation of an aryl ester of the imidodicarboxylic acid remaining unreacted in step (1), the rate of the polycondensation reaction can be increased. Specific example of the diaryl carbonate are diphenyl carbonate, ditolyl carbonate and dinaphthyl carbonate. Of these, diphenyl carbonate is especially preferred. The amount of the diaryl carbonate used is preferably 0.2 to 2.0 equivalents, especially about 0.4 to 1.5 equivalents, per equivalent of the unreacted imidodicarboxylic acid in the reaction product of the imidodicarboxylic acid and the aromatic monohydroxy compound.

Alternatively, according to this invention, the polyester-imide of this invention can also be produced by a second process given below.

The second process comprises (1) condensing a starting mixture comprising 1 mole of trimellitc anhydride, 0.5 to 0.8 mole of an aliphatic diamine represented by the following formula (VIB)

$$H_2N+CH_2)_nNH_2 \quad (VIB)$$

wherein n is an integer of 2 to 12, and 2 to 20 moles of an aromatic monohydroxy compound represented by the following formula (IIB)

$$Ar-OH \quad (IIB)$$

wherein Ar represents a benzene or naphthalene ring which may be substituted by a halogen atom or an alkyl group having 1 to 10 carbon atoms, under heat, and thereafter (2) polycondensing the resulting reaction mixture under heat with an amount, sufficient to distill substantially all of the aromatic monohydroxy compound from the reaction system, of a diol compound comprising a major proportion of a hydroquinone represented by the following formula (IIIB)

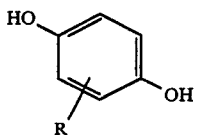 (IIIB)

wherein R is a hydrogen atom, an alkyl group having 1 to 10 carbon atoms, a cycloalkyl group having 5 to 10 carbon atoms, an aryl group having 6 to 10 carbon atoms, an aralkyl group having 7 to 12 carbon atoms, an alkoxy group having 1 to 10 carbon atoms, or a halogen atom, or a mixture of the diol compound and an aliphatic diamine until substantially all of the aromatic monohydroxy compound is distilled out of the reaction system.

The aliphatic diamine (VIB) and the aromatic monohydroxy compound (IIB) used in step (1) and the diol used in step (2) may be the same as described above with regard to the first process of the invention.

The step (1) is carried out by using 0.5 to 0.8 mole, preferably 0.5 to 0.7 mole, of the aliphatic diamine and 2 to 20 moles, preferably 3 to 10 moles, of the aromatic monohydroxy compound per mole of trimellitic acid.

By the reaction of step (1), the imidization reaction of the anhydride group of trimellitic anhydride with the aliphatic diamine and the esterification reaction between the carboxylic group of trimellitic acid anhydride and the aromatic monohydroxy compound take place mainly. Usually, the amidation reaction of the carboxyl group of trimellitic acid anhydride and the aliphatic diamine also takes place. Usually, the imidization proceeds at 100° to 220° C. The esterification reaction and the amidation reaction proceed at the same temperatures as described in step (1) in the first process.

The other reaction conditions in step (1) and the reaction conditions of step (2) in the second process may be the same reaction conditions as described with regard to the first process.

Thus, the first and second processes of this invention give melt-moldable crystalline polyester-imides comprising the units of formula (IA) as main recurring units.

Preferably, the crystalline polyester-imides of this invention contains at least 60 mole %, based on the entire acid component, of units derived from the iminodicarboxylic acid of formula (IB), namely units represented by the following formula (IA₁)

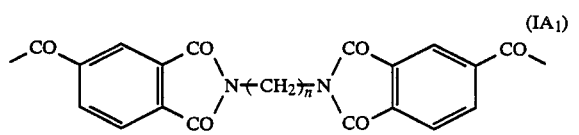 (IA₁)

wherein n is an integer of 2 to 12. Likewise, the crystalline polyester-imides of this invention preferably contain at least 60 mole %, based on the entire diol component, of units derived from the hydroquinone of formula (IIIB), namely a unit of the following formula (IA₂)

 (IA₂)

wherein R is as defined hereinabove.

In a preferred embodiment of this invention, the crystalline polyester-amides of this invention consist essentially of (1) 30 to 50 mole % of the unit of formula (IA₁),
(2) 25 to 50 mole % of the unit of formula (IA₂),
(3) 0 to 25 mole % of at least one unit selected from a unit of the following formula (IVA₁)

 (IVA₁)

wherein R is as defined above, a unit of the following formula (VA₁)

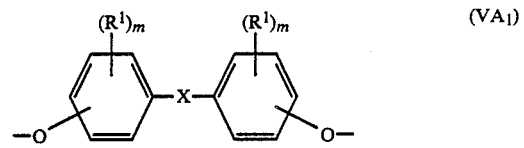 (VA₁)

wherein X is —CH₂—, —C(CH₃)₂—, —O—, —S—, SO₂—, —CO—,

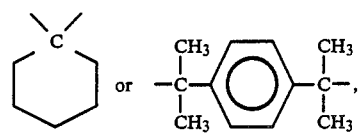

R¹ represents an alkyl group having 1 to 10 carbon atoms, an aryl group having 6 to 10 carbon atoms, or a halogen atoms, and m is a number of 0, 1 or 2, and a linear or branched aliphatic dioxy unit having 2 to 6 carbon atoms, (4) 0 to 25 mole % of a unit of the formula (VIA₁)

 (VIA₁)

wherein n is an integer of 2 to 12, and (5) 0 to 20 mole % of a unit represented by the following formula (IIA)

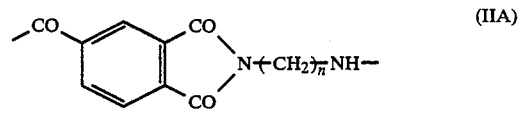 (IIA)

wherein n is as defined above.

The above units constitute the polyester-imides of this invention with the formation of ester and amide linkages. The mole percents above are based on the total amount of the above units.

The proportion of the ester linkages is preferably 60 to 100% based on the total amount of the ester and amide linkages.

The polyester-imides of this invention preferably have an inherent viscosity, measured at 35° C. in a mixed solvent of phenol and tetrachloroethane (in a weight ratio of 40:60), of at least 0.4, especially 0.5 to 1.2.

The polyester-imides of this invention are crystalline, and generally have a high melting point of, for example 250° to 350° C. For example, a polyester-imide derived from N,N'-1,6-hexamethylenebistrimellitimide [n=6 in formula (IA)]as an acid component and hydroquinone/t-butylhydroquinone (mole ratio 50:50) as a diol component has a melting point of 295° C. which is 40° C. higher than the melting point (255° C.) of polyethylene terephthalate. Thus, this polyester-imide has very high heat resistance. The polyester-imides of this invention have high rigidity, and usually are optically anisotropic when melted and optically isotropic when further heated to a higher temperature. In this case, let the temperature at which the polymer changes from a solid to an anisotropic phase be $T_{CN}$ and the temperature at which it changes from an anisotropic phase to an isotropic phase be $T_{NL}$, $(T_{NL}-T_{CN})$ of the polyester-imides of the invention is preferably not more than 40° C., especially preferably not more than 30° C. The values $T_{CN}$ and $T_{NL}$ can be determined by observing the polymers through a cross Nichol. The polyester-imides of this invention have a $T_{CN}$ of preferably at least 280° C., especially preferably at least 285° C., and a $T_{NL}$ of preferably not more than 350° C., especially preferably not more than 340° C.

The polyester-imides of this invention have high rigidity, but have the advantage that they easily become optically isotropic melts at temperatures above a certain point, and therefore can be melt-molded in a customary manner. Melt-molding may be carried out by extrusion, injection molding, compression molding, blow molding, etc. to form fibers, films, three-dimensional articles, receptacles and hoses. Fibers or films having excellent mechanical properties represented by a very high Young's modulus and excellent thermal and chemical properties represented by high heat resitance and hydrolysis resistance can be obtained by stretching the fibers or films after melt-spinning or film-forming in at least one axial direction at a temperature above the glass transition temperature but below the melting point, and preferably heat-treating the stretched product at a temperature above the stretching temperature but below the melting point.

Film production will be described specifically below. The polyester-imide of this invention is dried and melted at a temperature of from the melting point (Tm, °C.) of the polymer (when it does not show melt anisotropy) or from the temperature (Tm') at which the polymer changes from an anisotropic phase to an isotropic phase (when it shows melt anisotropy) to 360° C., preferably at a temperature of from (Tm or Tm'+5)°C. to 350° C., more preferably at a temperature of from (Tm or Tm'+10)° C. to 340° C. The molten polymer is extruded from a film-forming slit and taken up by rollers kept at a temperature not higher than the glass transition point (Tg, °C.) of the polymer to form an unstretched film. The film is then stretched and heat-treated. Stretching is carried out monoaxially or biaxially at a temperature from Tg to Tm, preferably from (Tg+5)°C. to (Tm−30)°C., more preferably from (Tg+10)°C. to (Tm−50)°C. In the case of biaxial stretching, the stretching in a different direction is preferably at right angles to the direction of the monoaxial stretching. The stretching temperature in the second direction is from the monoaxial stretching temperature to Tm, preferably from the monoaxial stretching temperature to (Tm−20)°C., more preferably from the monoaxial stretching temperature to (Tm−40)°C. The stretch ratio is at least 4, preferably at least 5, more preferably at least 6, in terms of an area ratio. The heat-treatment is usually carried out at a temperature from the final stretching temperature to Tm, preferably from the final stretching temperature to (Tm−10)°C. During the heat-treatment, the film may be at constant length, under tension or under restricted shrinkage. The heat-treating time is at least 1 second to 120 minutes, preferably 2 seconds to 60 minutes, especially preferably not more than 30 minutes.

The film formed from the polyester-imide of the invention may, for example, be formed into a laminated film by laminating an electrically conductive metal layer on at least one surface thereof, and used, for example, in producing a flexible printed circuit by utilizing its excellent mechanical properties such as a high Young's modulus and excellent heat resistance.

When a molded article, such as a film, of the polyester-imide of this invention is heat-treated in the presence of molecular oxygen at a temperature and for a time which satisfy the following two expressions $$\log t \geq \frac{6000}{(T + 273)} - 11.3$$

$$200 \leq T \leq Tm$$

wherein T is the heat-treatment temperature (°C.), Tm is the melting point (°C.) of the polymer, and t is the heat-treating time (hours), there is obtained a material having very superior solvent resistance, for example such that even when treated at 140° C. for 30 minutes in a mixed solvent of phenol and tetrachloroethane (weight ratio 40:60) in a concentration of 1.2 g/dl, at least a part of the polymer remains undissolved.

The polyester-imides of this invention may as required include known additives such as stabilizers (e.g., ultraviolet absorbers and antioxidants), plasticizers, fire retardants, mold releasing agents, pigments, nucleating agents, and fillers.

Investigations of the present inventors have shown that metal salts of orgnaic sulfonic acids represented by the following formula $$R^2-SO_3M \text{ or } (R^2-SO_3)_2M^1$$

wherein M is an alkali metal, $M^1$ is an alkaline earth metal, $R^2$ is an aliphatic or aromatic radical which may be substituted by a halogen atom, a nitro group or a sulfone group, are fire-retarding agents which impart particularly excellent fire retardancy to the polyeser-imides of this invention, and that the suitable amount of such fire retardants is 0.1 to 10 parts by weight per 100 parts by weight of the polymer.

The following examples illustrate the present invention more specifically.

The inherent viscosities are measured at 35° C. using a phenol/tetrachloroethane mixed solvent (weight ratio 40/60). The glass transition temperatures (Tg) and melting points (Tm) were measured by DSC at a temperature elevating rate of 10° C./min.

The amount of the unreacted carboxyl groups was measured in accordance with the method of A. Conix [Macromol. Chem., 26, 226 (1958)].

All parts in these examples are parts by weight unless otherwise specified.

EXAMPLE 1

A reactor equipped with a stirrer was charged with 616 parts of N,N'-1,6-hexamethylenebistrimellitimide diphenyl ester, 61 parts of hydroquinone, 83 parts of t-butylhydroquinone and 0.047 part of stannous acetate. The mixture was maintained at 240° C. under atmospheric pressure for 30 minutes in a nitrogen stream and then heated to 330° C. over about 90 minutes. The resulting phenol was distilled out of the reactor. The inside pressure of the reactor was then reduced, and the reaction mixture was further maintained under a weak vacuum of about 15 mmHg for 15 minutes and then under a high vacuum of 0.5 mmHg for 30 minutes. The resulting polymer had an inherent viscosity of 0.72, a Tg of 135° C. and a Tm of 295° C. When observed through a cross Nichol, the polymer was optically anisotropic below 303° C. and optically isotropic above 303° C.

EXAMPLE 2

The polyester-imide obtained in Example 1 was dried, and then extruded from a spinning nozzle having a diameter of 0.5 mm and a length of 1 mm at a temperature of 330° C. using a Koka-type flow tester to form an undrawn filament. The undrawn filament was drawn to 6.5 times on a hot plate kept at 200° C. The drawn filament had a tenacity of 5 g/de and a Young's modulus of 150 g/de.

EXAMPLE 3

The polyester-imide obtained in Example 1 was dried, and then extruded from a T-die kept at 320° C. using an extruder (25 mmφ) to give an unstretched film having a thickness of about 200 microns. The film was stretched to 2.8 times at 180° C. in the transverse direction (TD) and then to 2.3 times at 200° C. in the machine direction (MD) to give a stretched film having the properties shown in Table 1.

TABLE 1

| Stretching direction | Strength (Kg/mm$^2$) | Elongation (%) | Young's modulus (Kg/mm$^2$) |
| --- | --- | --- | --- |
| MD | 32.0 | 10 | 740 |
| TD | 14.0 | 17 | 310 |

EXAMPLE 4

A reactor equipped with a stirrer was charged with 700 parts of N,N'-1,12-dodecamethylenebistrimellitimide diphenyl ester, 116 parts of hydroquinone and 0.047 part of stannous acetate, and the mixture was subjected to polycondensation under the same conditions as in Example 1. The resulting polymer had an inherent viscosity of 0.80 and a Tm of 274° C. and 280° C. When observed through a cross Nichol, the polymer was optically anisotropic within the above-mentioned temperature range, and isotropic above 280° C.

EXAMPLE 5

The polymer obtained in Example 4 was formed into a film at 310° C. by using the same device as in Example 3. The unstretched film was stretched monoaxially to 8.5 times at 110° C. to give a stretched film having a strength of 30.6 kg/mm$^2$, an elongation of 6% and a Young's modulus of 910 kg/mm$^2$.

EXAMPLE 6 AND COMPARATIVE EXAMPLE 1

The unstretched film obtained in Example 3 and as a comparison, an unstretched film of polyethylene terephthalate were each immersed in a 20% aqueous solution of sodium hydroxide at 50° C., and after immersion for 20 hours, their weight retentions were measured. The polyester-imide film obtained in Example 3 had a weight retention of 80%, and the polyethylene terephthalate film had a weight retention of 59%. This demonstrates the superior alkali resistance of the polyester-imide film.

EXAMPLE 7

A reactor equipped with a stirrer was charged with 616 parts of N,N'-1,6-hexamethylenebistrimellitimide diphenyl ester, 105 parts of methylhydroquinone, 33 parts of t-butylhydroquinone and 0.034 part of tetrabutyl titanate, and the mixture was subjected to polycondensation under the same conditions as in Example 1 except that the time during which the reaction was carried out under a high vacuum was changed to 45 minutes. The resulting polymer had an inherent viscosity of 0.83 and a Tm of 296° C. When observed through a cross Nichol, the polymer was optically isotropic at temperatures above 305° C.

EXAMPLE 8

A reactor equipped with a stirrer was charged with 616 parts of N,N'-1,6-hexamethylenebistrimellitimide diphenyl ester, 82 parts of hydroquinone, 68 parts of bisphenol A and 0.047 part of stannous acetate. In a nitrogen stream, the mixture was maintained at 240° C. under atmospheric pressure for 30 minutes, and then heated to 330° C. over about 90 minutes. The resulting phenol was distilled out of the reactor. The inside pressure of the reactor was then reduced, and the reaction was carried out for 15 minutes under a weak vacuum of about 15 mmHg and for 30 minutes under a high vacuum of 0.5 mmHg. The resulting polymer had an inherent viscosity of 0.78, a Tg of 125° C. and a Tm of 310° C. When observed under a cross Nichol, the polymer was optically anisotropic below 316° C. and isotropic above 316° C.

EXAMPLE 9

The polyester-imide of Example 8 was dried, and melt-extruded from a T-die at 330° C. using a monoaxial extruder (25 mmφ) to give an unstretched film having a thickness of about 200 microns.

The film was then stretched to 2.3 times at 180° C. in the machine direction and simultaneously to 4.5 times in a direction at right angles to the machine direction (i.e., in the transverse direction). The biaxially stretched film had the properties given in Table 2.

TABLE 2

| Stretching direction | Strength (Kg/mm$^2$) | Elongation (%) | Young's modulus (Kg/mm$^2$) |
| --- | --- | --- | --- |
| MD | 25.4 | 18 | 320 |
| TD | 13.5 | 28 | 660 |

The biaxially stretched film was heat-treated with hot air at 280° C. for 2 minutes at constant length and further for 1 minute under a restricted shrinkage of 3% in both the machine and transverse directions. The film was immersed for 30 seconds in an oil at 260° C. It showed a thermal shrinkage of 0.3% in the machine direction and 0.2% in the transverse direction.

EXAMPLE 10

N,N'-1,6-hexamethylenebistrimellitimide diphenyl ester (616 parts), 71 parts of hydroquinone, 45.6 parts of bisphenol A, 33.2 parts of t-butylhydroquinone and 0.047 part of stannous acetate were subjected to the same polycondensation conditions as in Example 8. The resulting polymer had an inherent viscosity of 0.81, a Tg of 135° C. and a Tm of 295° C. When observed through a cross Nichol, the polymer was optically anisotropic below 302° C. and optically isotropic above 302° C.

EXAMPLE 11

The polyester-imide obtained in Example 10 was dried, and then extruded from a spinning nozzle having a diameter of 0.5 mm and a length of 1 mm at a temperature of 330° C. using a Koka-type flow tester to form an undrawn filament. The undrawn filament was drawn to 5.8 times at 180° C. The drawn filament had a tenacity of 5.4 g/de and a Young's modulus of 138 g/de.

EXAMPLE 12

The polyester-imide obtained in Example 10 was dried, and then extruded from a T-die kept at 320° C. using an extruder (25 mmφ) to give an unstretched film having a thickness of about 200 microns. The film was stretched to 2.0 times at 160° C. in the transverse direction (TD) and then to 5.0 times at 180° C. in the machine direction (MD) to give a stretched film having the properties shown in Table 3.

TABLE 3

| Stretching direction | Strength (Kg/mm$^2$) | Elongation (%) | Young's modulus (Kg/mm$^2$) |
| --- | --- | --- | --- |
| MD | 27.8 | 16 | 760 |
| TD | 11.0 | 25 | 280 |

EXAMPLE 13

A reactor equipped with a stirrer was charged with 616 parts of N,N'-1,6-hexamethylenebistrimellitimide diphenyl ester, 77 parts of hydroquinone, 16.6 parts of t-butylhydroquinone, 57 parts of bisphenol A and 0.047 part of stannous acetate. In a nitrogen stream under atmospheric pressure, the mixture was maintained at 240° C. for 30 minutes, and then heated to 330° C. over about 90 minutes. The resulting phenol was distilled out of the reactor. The inside pressure of the reactor was then reduced, and the reaction mixture was further maintained under a weak vacuum of about 15 mmHg for 15 minutes and then under a high vacuum of 0.5 mmHg for 40 minutes. The resulting polymer had an inherent viscosity of 0.88, a Tg of 134° C. and a Tm of 302° C. When observed through a cross Nichol, the polymer was optically anisotropic below 310° C. and optically isotropic above 310° C.

EXAMPLE 14

Hexamethylenediamine (116 parts), 384 parts of trimellitic anhydride, 564 parts of phenol and 0.17 part of tetrabutyl titanate were put into a reactor equipped with a stirrer and a distillation system, and reacted at 140 to 200° C. under atmospheric pressure for 4 hours in a nitrogen stream, and about 35 parts of the generated water was distilled out of the reactor. The reaction system was then maintained under a nitrogen pressure of 3 kg/cm$^2$, and the reaction mixture was reacted at 260° C. for 4 hours. The resulting water was distilled out of the reactor. During this reaction under pressure, the reaction was gradually decreased from 3 kg/cm$^2$ to 1 kg/cm$^2$. A part of the reaction product was sampled, and its carboxyl group content was measured. It was found that the reaction conversion was 94.5%. Then, 79 parts of hydroquinone, 68 parts of bisphenol A and 16 parts of diphenyl carbonate were added. In a nitrogen stream under atmospheric pressure, the mixture was maintained at 240° C. for 30 minutes and then heated to 330° C. over about 90 minutes. The phenol was distilled out of the reactor. The reaction mixture was then polycondensed for 30 minutes under a weak vacuum of about 15 mmHg and then for 60 minutes under a high vacuum of 0.3 mmHg. The resulting polymer had an inherent viscosity of 0.85 and a Tm of 310° C.

EXAMPLE 15

N,N'-hexamethylenebistrimellitimide (464 parts), 470 parts of phenol and 0.07 part of tetrabutyl titanate were put into the same reactor as in Example 14, and reacted at 255° C. for 5.5 hours under a nitrogen pressure of 3 kg/cm$^2$. The resulting water was distilled out of the reactor. The pressure of the reaction system was gradually decreased to 1 kg/cm$^2$. The pressure of the reaction system was then maintained under normal atmospheric pressure in a nitrogen stream, and the excess of phenol was distilled out of the reactor. At this stage, the carboxyl group content of the reaction product was measured, and it was found that the reaction conversion was 97.7%. To the reaction product were added 68 parts of hydroquinone, 46 parts of bisphenol A, 33 parts of t-butylhydroquinone and 6 parts of diphenyl carbonate. In a nitrogen stream, the mixture was maintained at 255° C. under atmospheric pressure, and then heated to 330° C. over 90 minutes. The resulting phenol was distilled out of the reactor. The reaction mixture was then polycondensed for 15 minutes under a weak vacuum of about 15 mmHg and then for 45 minutes under a high vacuum of 0.3 mmHg. The resulting polymer had an inherent viscosity of 0.88 and a Tm of 295° C.

EXAMPLE 16

Hexamethylenediamine (116 parts), 383 parts of trimellitic anhydride, 520 parts of phenol and 0.15 part of tetrabutyl titanate were introduced into the same reactor as used in Example 14, and reacted at 150° to 200° C. for 6.5 hours under atmospheric pressure in a nitrogen stream. The resulting water was distilled out of the reactor. Then, the reaction system was maintained under a nitrogen pressure of 3 kg/cm$^2$, and the reaction mixture was heated to 265° C. and maintain at this temperature for 4.5 hours. The resulting water was distilled out of the reactor. During this reaction under pressure, the pressure was gradually decreased from 3 kg/cm$^2$ to 1 kg/cm$^2$. Then, the reaction mixture was heated at the same temperature for 30 minutes under atmospheric pressure in a nitrogen stream. The excess of phenol was distilled out of the reactor. A part of the reaction product was sampled, and its carboxyl group content was measured. The reaction conversion was 98.5%. The reaction product was mixed with 58 parts of hydroquinone and 83 parts of t-butylhydroquinone. In a nitrogen stream under reduced pressure, the mixture was maintained at the same temperature for 30 minutes, and then heated to 330° C. over 90 minutes. The mixture was maintained at this temperature for 30 minutes. Over the course of 20 minutes the pressure was reduced to a weak vacuum of about 15 mmHg, and the mixture was maintained under this pressure for 10 minutes. Then, the pressure was reduced to a high vacuum of 0.3 mmHg, and the reaction mixture wa polymerized under this pressure for 1.5 hours. The resulting polymer had an inherent viscosity of 0.80 and a Tm of 295° C.

EXAMPLE 17

Hexamethylenediamine (116 parts), 374 parts of trimellitic anhydride, 650 parts of p-cresol and 0.1 part of tetrabutyl titanate were introduced into the same reactor as in Example 14, and reacted at 150° to 200° C. under atmospheric pressure in a nitrogen stream for 6 hours. The resulting water was distilled out of the reactor. The reaction system was then maintained under a nitrogen pressure of 2.7 kg/cm$^2$, and the mixture was reacted at 250° C. for 4 hours. During this reaction, the pressure was gradually decreased from 2.7 kg/cm$^2$ to 1 kg/cm$^2$. The resulting water was distilled from the reactor. After the reaction, a part of the reaction product was sampled, and its carboxyl group content was measured. The reaction conversion was 98.2%. To the reaction product were added 77 parts of hydroquinone, 68 parts of bisphenol A and 5.8 parts of hexamethylenediamine. In a nitrogen stream under atmospheric pressure, the mixture was maintained at 245° C. for 30 minutes, and then heated to 330° C. over about 90 minutes. The p-cresol was distilled out of the reactor. The reaction mixture was then polycondensed for 30 minutes under a weak vacuum of about 15 mmHg and then for about 60 minutes under a high vacuum of 0.2 mmHg. The resulting polymer had an inherent viscosity of 0.78 and a Tm of 298° C. and showed a good color.

EXAMPLE 18

A reactor equipped with a stirrer was charged with 616 parts of N,N'-1,6-hexamethylenebistrimellitimide diphenyl ester, 71 parts of hydroquinone, 44 parts of resorcinol and 0.3 part of antimony trioxide. In a stream of nitrogen, the compounds were heated under atmospheric pressure at 240° C. for 30 minutes, at 280° C. for 30 minutes and then at 330° C. for 30 minutes, and phenol formed was distilled out of the reactor. The inside of the reactor was then maintained under reduced pressure, and the reaction was carried out for 15 minutes under weak vacuum, and then for 40 minutes under a high vacuum of 0.3 mmHg. The resulting polymer had an inherent viscosity of 0.69 and a Tm of 310° C.

EXAMPLE 19

The same reactor as used in Example 18 was charged with 616 parts of N,N'-1,6-hexamethylenebistrimellitimide diphenyl ester, 77 parts of hydroquinon, 36 parts of neopentyl glycol and 0.3 part of antimony trioxide, and the compounds were reacted under the same conditions as in Example 18. The resulting polymer had an inherent viscosity of 0.75 and a Tm of 300°.

EXAMPLE 20

A reactor equipped with a stirrer and a distillation system was charged with 288 parts of trimellitic anhydride, 116 parts of hexamethylenediamine, 494 parts of phenol and 0.17 part of tetrabutyl titanate. The compounds were reacted under atmospheric pressure at 170° to 180° C. for 2 hours in a stream of nitrogen, and water formed was distilled out of the reactor. The reaction system was then pressurized with nitrogen to 3 kg/cm$^2$, and the reaction temperature was elevated to 260° C. The reaction was carried out under these conditions for 4 hours, and water formed was distilled out of the reactor. During this reaction under pressure, the pressure was gradually decreased to 1 kg/cm$^2$, and as a result, the reaction temperature gradually decreased to 225° C. After the reaction, the reaction system was maintained under atmospheric pressure in a stream of nitrogen, and the excess of phenol was distilled out of the reactor. A part of the reaction product was sampled, and its carboxyl group content was measured. The conversion was found to be 93%. Hydroquinone (58 parts) and 23 parts of diphenyl carbonate were added to the reaction product, and the mixture was heated at 240° C. for 30 minutes, and then to 330° C. over the course of 90 minutes, under atmospheric pressure in a stream of nitrogen. Phenol formed was distilled out of the reactor. Then, the pressure of the reaction system was gradually reduced to about 10 mmHg over 15 minutes, and the reaction was carried out under this pressure for 15 minutes, and thereafter, the polycondensation was carried out under a high vacuum of 0.3 mmHg for 90 minutes. The resulting polymer had an inherent viscosity of 0.82 and a Tm of 289° C.

EXAMPLE 21

The same reactor as used in Example 20 was charged with 116 parts of hexamethylenediamine, 326 parts of trimellitic anhydride, 564 parts of phenol and 0.29 part of antimony trioxide, and the compounds were subjected to imidization and esterification under the same conditions as in Example 20. Under atmospheric pressure, the excees of phenol was distilled out of the reactor. The carboxyl group content of the reaction product was measured, and the conversion was found to be 89%.

Then, 74 parts of hydroquinone, 19 parts of bisphenol A and 42 parts of diphenyl carbonate were added to the reaction product, and the mixture was subjected to polycondensation under the same conditions as in Example 20. The resulting polymer had an inherent viscosity of 0.80 and a Tm of 290° C.

EXAMPLE 22

The polymer chips obtained in Example 21 were dried, and then extruded at 320° C. by an extruder (25 mm$\phi$) from a film-forming T-die to form an unstretched film having a thickness of about 150 microns. The film was stretched at 160° C. simultaneously in the machine direction (MD) to 2.4 times and in the transverse direction (TD) to 3.5 times. The properties of the resulting film are shown in Table 4.

TABLE 4

| Stretching direction | Strength (kg/mm$^2$) | Elongation (%) | Young's modulus (kg/mm$^2$) |
|---|---|---|---|
| MD | 12.0 | 12 | 400 |
| TD | 21.0 | 18 | 520 |

What is claimed is:
1. A melt-moldable crystalline polyester-imide consisting essentially of (1) ester linkages and imide linkages or (2) ester linkages, imide linkages and amide linkages and having units of the following formula (IA)

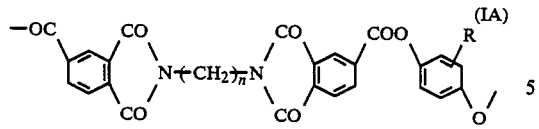
(IA)

wherein R represents a hydrogen atom, an alkyl group having 1 to 10 carbon atoms, a cycloalkyl group having 5 to 10 carbon atoms, an aryl group having 6 to 10 carbon atoms, an aralkyl group having 7 to 12 carbon atoms, an alkoxy group having 1 to 10 carbon atoms, or a halogen atom, and n is an integer of 2 to 12,
as main recurring units.

2. The crystalline polyester-imide of claim 1 wherein the proportion of the units of formula (IA) is at least 50 mole % based on the entire recurring units.

3. The crystalline polyester-imide of claim 1 wherein the proportion of the units of formula (IA) is at least 60 mole % based on the entire recurring units.

4. The crystalline polyester-imide which further contains units represented by the following formula (IIA)

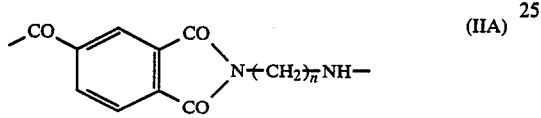
(IIA)

wherein n is an integer of 2 to 12, and the —NH— group forms an amide linkage.

5. The crystalline polyester-imide of claim 1 which contains at least 60 mole %, based on the entire acid component, of units derived from a dicarboxylic acid represented by the following formula (IB)

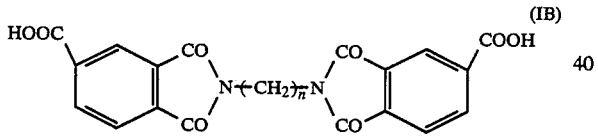
(IB)

wherein n is an integer of 2 to 12.

6. The crystalline polyester-imide of claim 1 which contains at least 60 mole %, based on the entire diol component, units derived from a hydroquinone represented by the following formula (IIIB)

(IIIB)

wherein R is as defined for formula (IA).

7. The crystalline polyester-imide of claim 1 which consists essentially of
(1) 30 to 50 mole % of units represented by the following formula (IA₁)

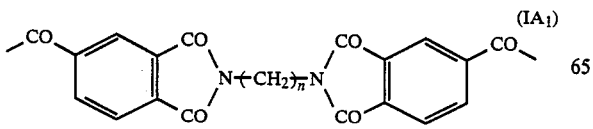
(IA₁)

wherein n is an integer of 2 to 12,
(2) 25 to 50 mole % of units represented by the following formula (IA₂)

(IA₂)

wherein R represents a hydrogen atom, an alkyl group having 1 to 10 carbon atoms, an alkoxy group having 1 to 10 carbon atoms, a halogen atom, a cycloalkyl group having 1 to 10 carbon atoms, an aryl group havin 6 to 10 carbon atoms, or an aralkyl group having 7 to 12 carbon atoms,
(3) 0 to 25 mole % of at least one unit selected from a unit of the following formula (IVA₁)

(IVA₁)

wherein R is as defined above,
a unit of the following formula (VA₁)

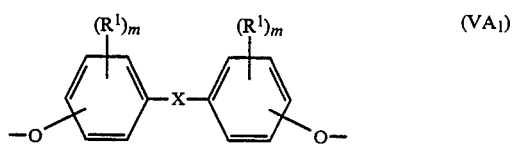
(VA₁)

wherein X is —CH₂—, —C(CH₃)₂—, —O—, —S—, SO₂—, —CO—,

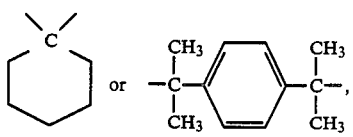

R¹ represents an alkyl group having 1 to 10 carbon atoms, an aryl group having 6 to 10 carbon atoms, or a halogen atoms, and m is a number of 0, 1 or 2, and a linear or branched aliphatic dioxy unit having 2 to 6 carbon atoms,
(4) 0 to 25 mole % of a unit of the formula (VIA₁)

—NH(CH₂—)ₙNH— (VIA₁)

wherein n is an integer of 2 to 12, and
(5) 0 to 20 mole % of a unit represented by the following formula (IIA)

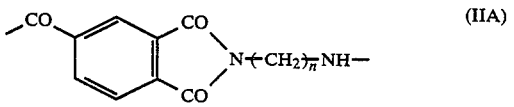
(IIA)

wherein n is as defined,
said units being bonded to each other forming ester linkages or amide linkages, and the mole % being based on the entire units.

8. The crystalline polyester-imide of claim 7 wherein the proportion of the ester linkages is 60 to 100% based on the total amount of the ester linkages and the amide linkage.

9. The crystalline polyester-imide of claim 1 which has an inherent viscosity, measured at 35° C. in a phenol/tetrachloroethane mixed solvent (weight ratio 40/60), of at least 0.4.

10. The crystalline poilyester-imide of claim 9 which has an inherent viscosity of 0.5 to 1.2.

11. The crystalline polyester-imide of claim 1 which has a melting temperature in the range of 280° to 350° C.

12. The crystalline polyester-imide of claim 1 which is optically anisotropic when melted, and become optically isotropic when heated to a higher temperature.

13. The crystalline polyester-imide of claim 12 wherein the difference between the melting temperature and the phase transition temperature at which the polyester-imide changes from an optically isotropic phase to an optically anisotropic phase is less than 40° C.

14. A process for producing the crystalline polyester-imide of claim 1, which comprises
(1) condensing a starting mixture containing 1 mole of an imidodicarboxylic acid represented by the following formula (IB)

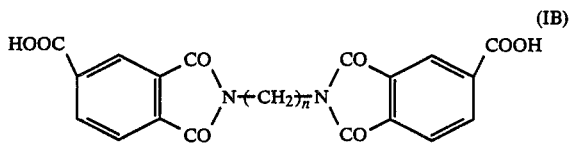

wherein n is an integer of 2 to 12, and 2 to 20 moles of an aromatic monohydroxy compound represented by the following formula (IIB)

Ar—OH    (IIB)

wherein Ar represents a benzene or naphthalene ring which may be substituted by a halogen atom or an alkyl group having 1 to 10 carbon atoms, under heat while distilling water out of the reaction system, and thereafter
(2) polycondensing the resulting reaction mixture with an amount, sufficient to distill substantially all of the aromatic monohydroxy compound, of a diol compound comprising a major proportion of a hydroquinone represented by the following formula (IIIB)

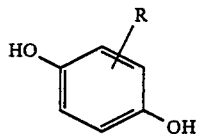

wherein R is as defined for formula (IA),
or a mixture of the diol compound and an aliphatic diamine under heat until substantially all the aromatic monohydroxy compound is distilled out of the reaction system.

15. A process for producing the crystalline polyester-imide of claim 1, which comprises
(1) condensing a starting mixture comprising 1 mole of trimellitic anhydride, 0.5 to 0.8 mole of an aliphatic diamine represented by the following formula (VIB)

$H_2N{+}CH_2{)}_nNH_2$    (VIB)

wherein n is an integer of 2 to 12,
and 2 to 20 moles of an aromatic monohydroxy compound represented by the following formula (IIB)

Ar—OH    (IIB)

wherein Ar represents a benzene or naphthalene ring which may be substituted by a halogen atom or an alkyl group having 1 to 10 carbon atoms, under heat, and thereafter (2) polycondensing the resulting reaction mixture under heat with an amount, sufficient to distill substantially all of the aromatic monohydroxy compound from the reaction system, of a diol compound comprising a major proportion of a hydroquinone represented by the following formula (IIIB)

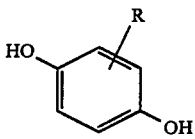

wherein R is as defined for formula (IA),
or a mixture of the diol compound and an aliphatic diamine until substantially all of the aromatic monohydroxy compound is distilled out of the reaction system.

16. A melt-molded article composed of the crystalline polyester-imide of claim 1.

17. The melt-molded article of claim 16 which is in the form of a film.

18. The melt-molded article of claim 16 which is in the form of a fiber.

* * * * *

UNITED STATES PATENT AND TRADEMARK OFFICE
CERTIFICATE OF CORRECTION

PATENT NO. : 4,760,124
DATED : July 26, 1988
INVENTOR(S) : SHUNICHI MATSUMURA ET AL.

It is certified that error appears in the above-identified patent and that said Letters Patent is hereby corrected as shown below:

Claim 4, line 1 of the claim, after "polyester-imide", insert --of claim 1--.

Claim 7, in sub-paragraph (2), line 16 of sub-paragraph (2), "havin" should read --having--.

Claim 7, in sub-paragraph (4), line 24 of sub-paragraph (4), "-NH(CH$_2$—)$_n$NH-" should read ---NH(CH$_2$$\rightarrow$$_n$NH- --.

Claim 10, line 1 of the claim, "poilyester-imide" should read --polyester-imide--.

Signed and Sealed this

Twenty-ninth Day of November, 1988

Attest:

DONALD J. QUIGG

Attesting Officer

Commissioner of Patents and Trademarks